US008331796B2

(12) United States Patent
Wernars et al.

(10) Patent No.: US 8,331,796 B2
(45) Date of Patent: Dec. 11, 2012

(54) METHOD AND DEVICE FOR COMMUNICATING DATA USING A LIGHT SOURCE

(75) Inventors: Johannes Petrus Wernars, Oss (NL); Victor Mayr, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 450 days.

(21) Appl. No.: 12/679,320

(22) PCT Filed: Sep. 22, 2008

(86) PCT No.: PCT/IB2008/053835
§ 371 (c)(1), (2), (4) Date: Mar. 22, 2010

(87) PCT Pub. No.: WO2009/040718
PCT Pub. Date: Apr. 2, 2009

(65) Prior Publication Data

US 2010/0196018 A1 Aug. 5, 2010

(30) Foreign Application Priority Data

Sep. 26, 2007 (EP) .................................... 07117268

(51) Int. Cl.
*H04B 10/00* (2006.01)

(52) U.S. Cl. ......... 398/172; 398/118; 398/189; 398/191

(58) Field of Classification Search .................. 398/118, 398/127, 189, 191
See application file for complete search history.

(56) References Cited

U.S. PATENT DOCUMENTS 5,633,629 A * 5/1997 Hochstein .................... 340/907
5,838,116 A * 11/1998 Katyl et al. .................. 315/307
6,181,082 B1 * 1/2001 Moisin .......................... 315/291
6,181,086 B1 * 1/2001 Katyl et al. .................. 315/307
6,208,446 B1 3/2001 Faifman
6,232,963 B1 * 5/2001 Tew et al. ..................... 345/204
6,333,605 B1 * 12/2001 Grouev et al. ................ 315/291
6,388,396 B1 * 5/2002 Katyl et al. .................. 315/294
6,393,608 B1 * 5/2002 Pulford et al. ................. 363/16
6,426,599 B1 * 7/2002 Leeb ............................ 315/224
6,429,605 B1 * 8/2002 Li ................................ 315/291
6,518,712 B2 * 2/2003 Weng ....................... 315/209 R (Continued)

FOREIGN PATENT DOCUMENTS

JP 60032443 A 2/1985

(Continued)

OTHER PUBLICATIONS

Jackson et al: “Fiat Lux: A Fluorescent Lamp Digital Transceiver”; IEEE Transactions on Industry Applications, vol. 34, No. 3, May/Jun. 1998, pp. 625-630.

*Primary Examiner* — Agustin Bello
(74) *Attorney, Agent, or Firm* — Mark L. Beloborodov

(57) ABSTRACT

A method is described for driving a light source, particularly a HID lamp (2), the method comprising the steps of: providing a commutating DC current for supplying the lamp; and varying a commutation period (T) in order to transmit data. In an embodiment, the duration of each commutation period (T) is set to be equal to one of two possible values (T1, T2) such as to encode a digital bit.

9 Claims, 4 Drawing Sheets

U.S. PATENT DOCUMENTS

| | | | | |
|---|---|---|---|---|
| 6,794,831 | B2 * | 9/2004 | Leeb et al. | 315/307 |
| 6,815,907 | B2 * | 11/2004 | Riederer | 315/209 R |
| 7,120,560 | B2 * | 10/2006 | Williams et al. | 702/188 |
| 7,508,144 | B2 * | 3/2009 | Yamauchi et al. | 315/291 |
| 2003/0001518 | A1 * | 1/2003 | Riederer | 315/247 |
| 2003/0030386 | A1 * | 2/2003 | Leeb et al. | 315/291 |
| 2004/0160199 | A1 * | 8/2004 | Morgan et al. | 315/312 |
| 2005/0184671 | A1 * | 8/2005 | Williams et al. | 315/119 |
| 2005/0231128 | A1 * | 10/2005 | Franklin | 315/224 |
| 2006/0181222 | A1 * | 8/2006 | Deurloo et al. | 315/209 R |
| 2006/0275039 | A1 | 12/2006 | Chen et al. | |
| 2006/0275040 | A1 | 12/2006 | Franklin | |
| 2006/0284728 | A1 * | 12/2006 | Rubinstein et al. | 340/310.12 |
| 2007/0057639 | A1 | 3/2007 | Sun et al. | |
| 2007/0188113 | A1 * | 8/2007 | Okamoto | 315/291 |
| 2007/0236157 | A1 * | 10/2007 | Okamoto | 315/291 |
| 2007/0273290 | A1 * | 11/2007 | Ashdown et al. | 315/113 |
| 2008/0024853 | A1 * | 1/2008 | Tanaka et al. | 359/238 |
| 2008/0137041 | A1 * | 6/2008 | Okamoto et al. | 353/85 |
| 2008/0164854 | A1 * | 7/2008 | Lys | 323/226 |
| 2009/0237011 | A1 * | 9/2009 | Shah et al. | 315/312 |
| 2010/0196018 | A1 * | 8/2010 | Wernars et al. | 398/172 |

FOREIGN PATENT DOCUMENTS

| | | | |
|---|---|---|---|
| WO | 2006016335 | A1 | 2/2006 |

* cited by examiner

METHOD AND DEVICE FOR COMMUNICATING DATA USING A LIGHT SOURCE

FIELD OF THE INVENTION

The present invention relates in general to the field of driving a light source, particularly but not exclusively a high-intensity discharge (HID) lamp.

BACKGROUND OF THE INVENTION

Typically, light sources used for illumination may be located in places which are difficult to access, for instance on/in ceilings or within luminaries. Therefore, it is difficult to check on the system and obtain system-related information, which would be useful in determining the status of the illumination system and to predict possibly needed maintenance and/or lamp replacement. Further, depending on the location of the lamps, physical access may even be dangerous.

SUMMARY OF THE INVENTION

An object of the present invention is to overcome or at least reduce the above-mentioned problems.

According to an important aspect of the present invention, a lighting system is capable of transmitting data by modulation of the generated light.

It is noted that the concept of modulating light in order to transmit data is already known for the case of fluorescent lamps, incandescent lamps, LEDs. However, the known modulation techniques (AM, FM, PWM) are not suitable for use with HID lamps due to HF (High Frequency) ripple limitations and light quality constraints.

Therefore, a specific object of the present invention is to provide a new modulation technique, particularly suitable for use with HID lamps.

Thus, in a specific aspect, the present invention proposes that a lamp is operated with commutating DC current, wherein the commutation period is varied in order to encode data. Thus, the lamp will always be operated at constant lamp current, and the frequency spectrum remains comparable to the frequency spectrum of "ordinary" HID lamps.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
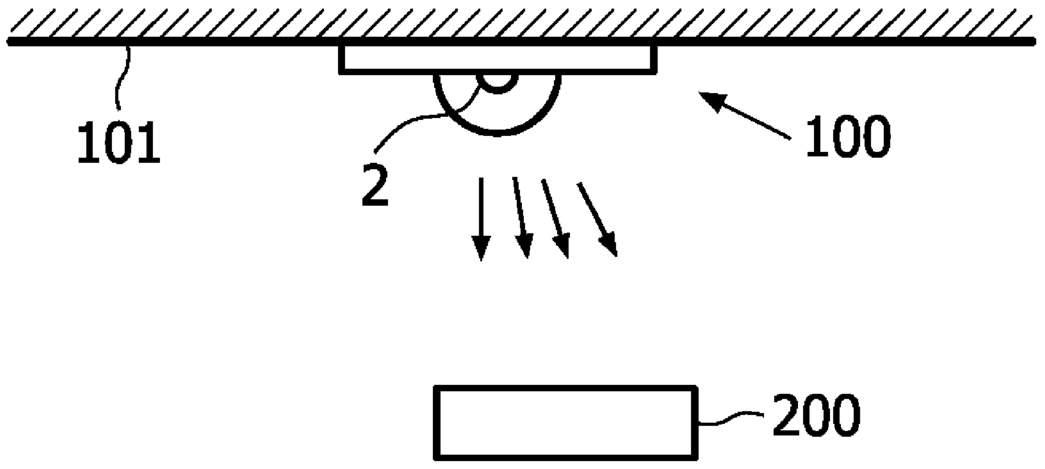
FIG. 1 schematically shows a luminaire.

FIG. 1 schematically shows a luminaire 100, mounted against a ceiling 101. The luminaire 100 contains at least one HID lamp 2.

Figure 2:
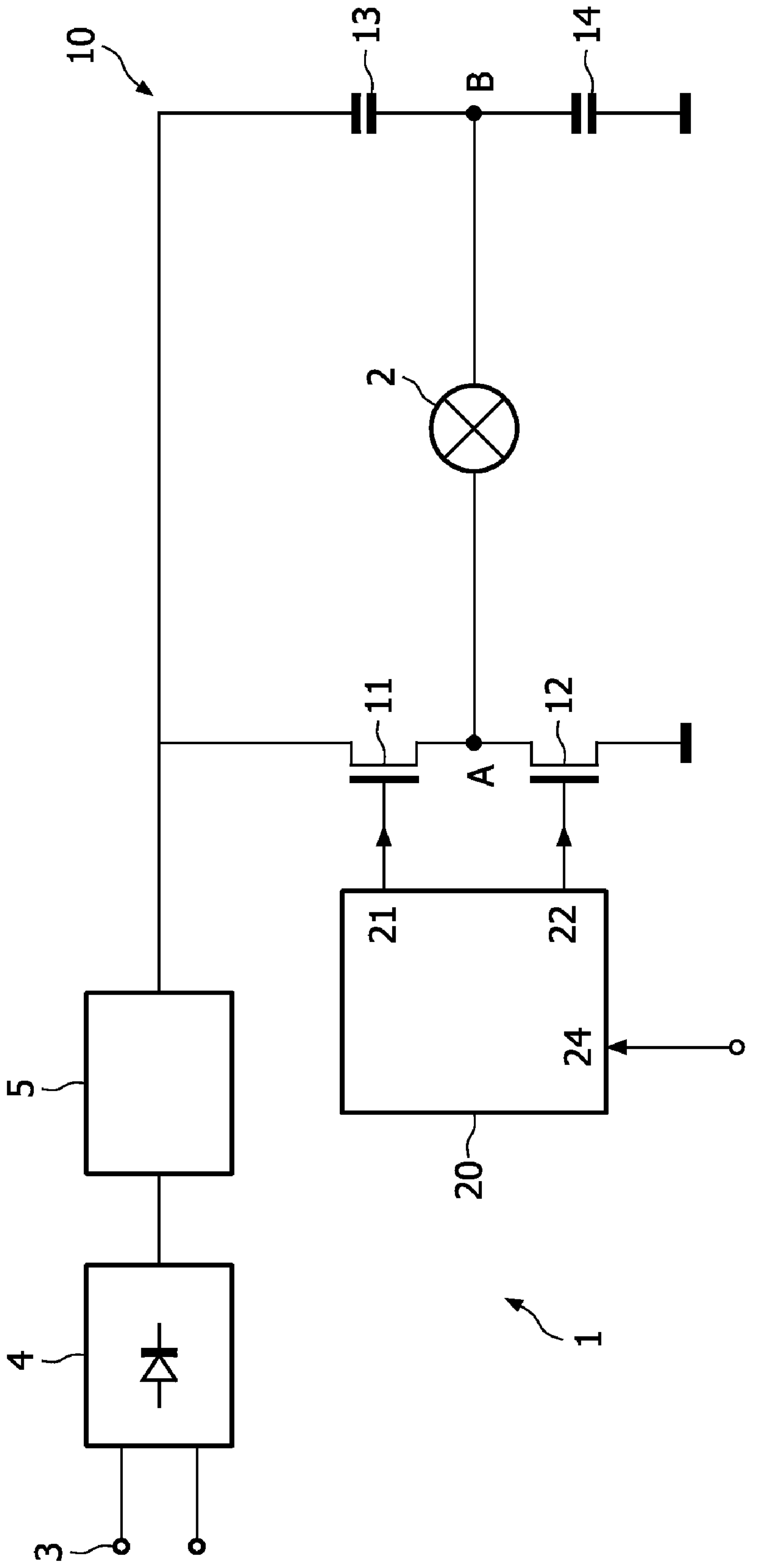
FIG. 2 schematically shows a block diagram of an electronic driver.

FIG. 2 schematically shows a block diagram of an exemplary embodiment of an electronic driver 1 for the HID lamp

2. The driver 1 comprises input terminals 3 for connection to mains (for instance 230 V @ 50 Hz), a rectifying section 4 for rectifying the mains voltage, and a converter section 5 for converting the rectified voltage received from the rectifying section 4 into a substantially constant current. Further, the driver 1 comprises a commutator section 10 for commutating the output current provided by the converter section 5. In the embodiment as depicted, the commutator section 10 has a well-known H-shaped bridge configuration comprising a series arrangement of two switches 11, 12 in parallel with a series arrangement of two capacitors 13, 14. Lamp output terminals 15, 16 for connecting the lamp 2 are coupled to a node A between the two switches 11, 12 and a node B between the two capacitors 13, 14, respectively. A controller 20 has output terminals 21, 22 coupled to control input terminals of the two switches 11, 12, respectively. Such general driver design is know per se, and a more detailed explanation of this design and its operation is not needed here.

It is noted that various other possibilities exist for implementing a lamp current supply. For instance, in stead of a half-bridge configuration, the commutator may have a full-bridge configuration, known per se.

It is further noted that the driver 1 may further comprise an igniter circuit, but this is not shown in the figure.

Figure 3:
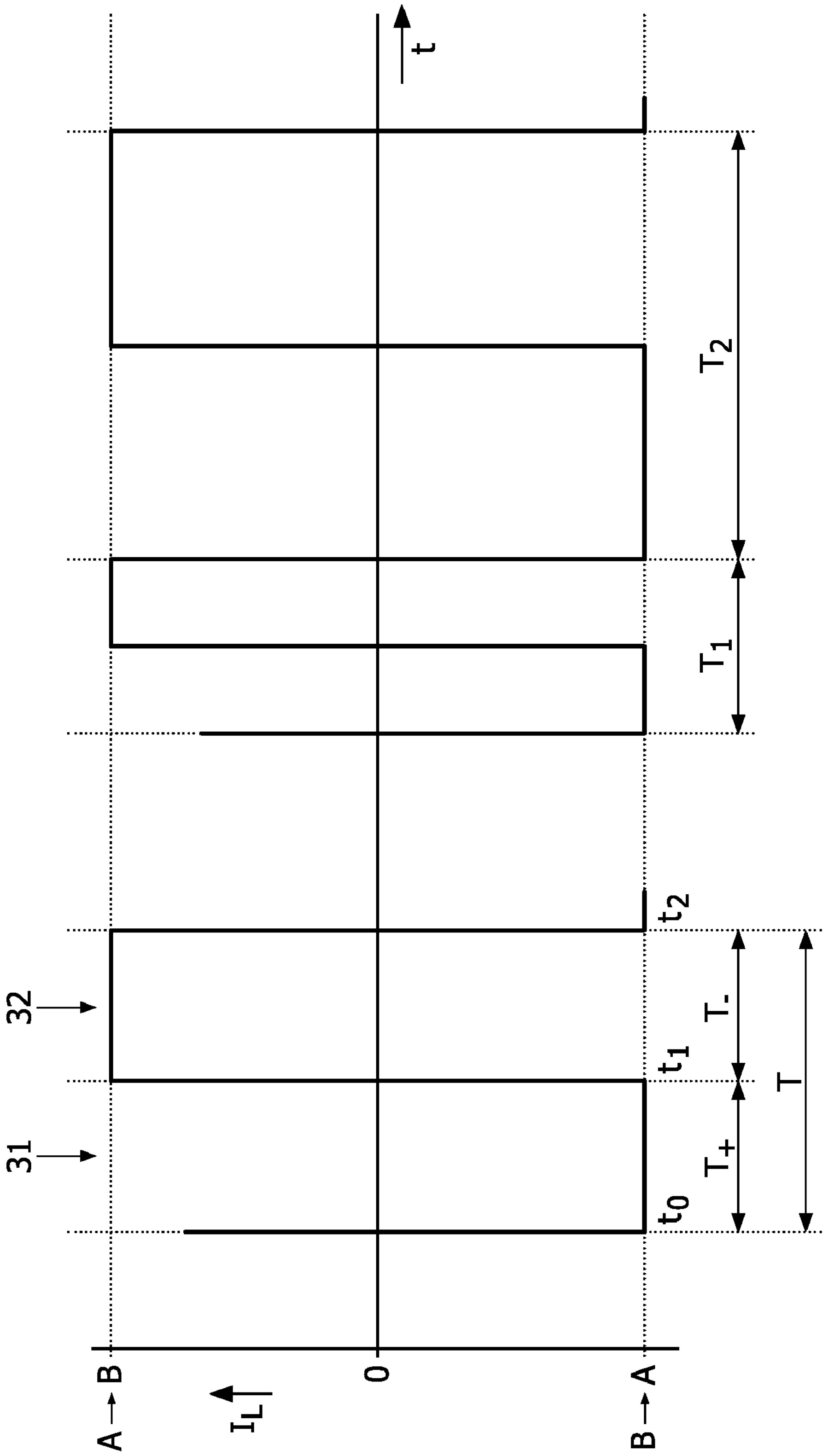
FIG. 3 is a graph schematically illustrating commutating lamp current.

At its output terminals 21, 22, the controller 20 generates control signals for the two switches 11, 12, respectively, such as to alternatively open and close these switches. Depending on which switch is open and which switch is closed, lamp current either flows from node A to node B, or vice versa, assuming that the lamp is ON. FIG. 3 is a graph schematically illustrating the lamp current as a function of time. Current flow direction from node A to node B is indicated as "positive" current, while current flow direction from node B to node A is indicated as "negative" current. The magnitude of the current (absolute value) remains substantially constant.

In FIG. 3, the current changes from negative to positive on time t0, changes from positive to negative on time t1, and changes from negative to positive again on time t2. A full current cycle has a cycle duration T=t2−t0. Such cycle will also be indicated as current period or commutation period, and contains two commutations. A current interval during which the current is positive will be indicated as positive current interval 31 having positive current interval duration $T_+$=t1−t0. A current interval during which the current is negative will be indicated as negative current interval 32 having negative current interval duration $T_-$=t2−t1. It will be evident that $T=T_++T_-$.

A duty cycle Δ will be indicated as $\Delta=T_+/T$. Typically, t1=t2 so that Δ=0.5, so that the average current is equal to zero; however, this is not essential for practising the present invention. Further, the cycle duration typically is in the order of about 10 ms, but the exact value of the cycle duration typically is not essential for understanding the present invention.

According to an important aspect of the present invention, the controller 20 is designed to vary the cycle duration T while maintaining the duty cycle Δ, in order to transmit data. The data may be data internal to the controller, or data received at a data input 24. Thus, the controller 20 is capable of conveying status information to a receiver 200, held at some distance from the luminaire 100 by maintenance personnel (see FIG. 1).

Figure 4:
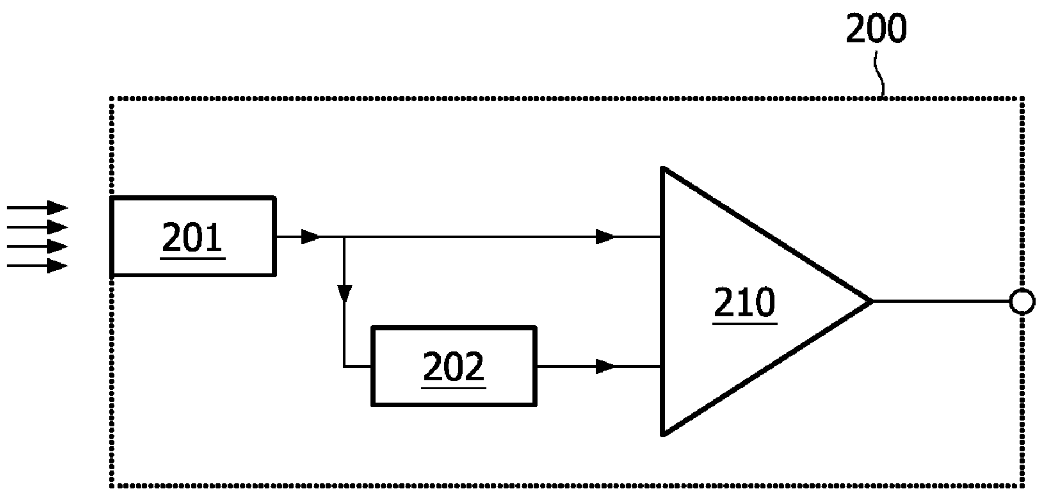
FIG. 4 schematically shows a block diagram of a receiver.

In an embodiment, the cycle duration T can take two values T1 and T2, with T2>T1. This is also illustrated in FIG. 3. FIG. 4 is a block diagram schematically illustrating a possible embodiment of the receiver 200, suitable for cooperation with this embodiment of the controller 20. A light sensor 201 receives the light from the lamp 2, and generates a signal containing commutation information. The signal is received by a reference clock 202 and by a first input of a comparator 210. The reference clock 202 generates a reference timing signal, triggered by the input signal from the light sensor 201, representing a reference duration between T1 and T2. From the input signal from the light sensor 201, the comparator 210 determines the cycle duration T, and compares this with the reference received from the reference clock 202. If the cycle duration T is longer than the reference, the comparator 210 decides to output a signal having a first value (for instance "1"), if the cycle duration T is shorter than the reference, the comparator 210 decides to output a signal having a second value (for instance "0"). Thus, each commutation cycle may represent one bit of digital data.

In principle, the above can be executed such that each current interval 31, 32 represents one bit of data. In such case, the comparator 210 will consider the time between two successive commutation moments. However, this may lead to the undesirable effect that the average lamp current is not equal to zero. Therefore, it is preferred that the one bit of data is represented by one commutation period, so that the comparator 210 will consider the time between two successive commutations having the same direction (either from positive to negative or from negative to positive).

It is noted that the lamp will not suffer from varying the duration of the commutation period, as long as the duration will not take extreme values.

It is further possible that one bit of data is represented by an integer number of commutation periods, i.e. 2T, 3T, 4T, etc, but this would decrease the data throughput capacity.

In the above example, there are two possible values for the duration of the commutation period, coding for one bit of data. However, it is also possible that there are more possible values for the duration of the commutation period, so that each commutation period may contain more information. For instance, if there are 4 possible values for the duration of the commutation period, each commutation period can code for a 0, 1, 2 or 3, corresponding with two bits of data. In general, if the possible number of values for the duration of the commutation period is equal to $2^m$, each commutation period can code for m bits of data.

Of course, a receiver should be suitably adapted to be able to detect the different duration values, as should be clear to a person skilled in the art.

Summarizing, the present invention provides a method for driving a light source, particularly a HID lamp (2). The method comprises the steps of:

providing a commutating DC current for supplying the lamp; and varying a commutation period T in order to transmit data.

In an embodiment, the duration of each commutation period T is set to be equal to one of two possible values T1, T2 such as to encode a digital bit.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Method for transmitting data from a light source comprising a HID lamp by modulating the light generated thereby, the method comprising the steps of:

providing a commutating DC current for supplying the lamp; and varying a commutation period (T) in order to transmit data.

2. Method according to claim 1, wherein the duration of each commutation period (T) is set to be equal to one of two possible values (T1, T2) to encode a digital bit.

3. Method according to claim 2, comprising the steps of:

receiving a bit of data;

determining whether the data bit has a first value ("0") or a second value ("1");

depending on the outcome of said determination, setting the duration of a commutation period (T) to be equal to either a first one (T1) of said two possible values (T1, T2) or a second one (T2) of said two possible values (T1, T2).

4. Method according to claim 1, wherein the duration of each commutation period (T) is set to be equal to one of N possible values, N being a positive integer.

5. Method according to claim 4, wherein $N=2^m$, m being a positive integer, to encode for m bits per commutation period.

6. Method according to claim 5, further comprising the steps of: receiving m bits of data;

determining the value of these m bits in the range from 0 to $2^m-1$;

depending on the outcome of said determination, setting the duration of a commutation period (T) to be equal to one of said N possible values.

7. Method according to claim 1, comprising the steps of:

determining a plurality of M consecutive commutation periods, M being a positive integer;

setting the duration of each commutation period in said plurality of M consecutive commutation periods to be equal to one of N possible values, N being a positive integer;

such that said plurality of M consecutive commutation periods encode for m bits of data, wherein $m={}^2\log(N)$.

8. Method according to claim 1, wherein each commutation period has a duration in the range of 1-25 ms.

9. Electronic driver for a light source comprising a HID lamp, the driver comprising:

current generating means for generating a DC current;

a commutator section for receiving the DC current and providing a commutating lamp current;

a controller controlling the timing of the commutation moments (t1, t2);

wherein the controller is configured for varying a commutation period (T) in order to transmit data via the light emitted by the lamp.

* * * * *